US012249216B2

(12) United States Patent
Englman et al.

(10) Patent No.: US 12,249,216 B2
(45) Date of Patent: Mar. 11, 2025

(54) SYSTEMS AND METHODS FOR SUPPLEMENTING A WAGERING GAME

(71) Applicant: Aristocrat Technologies Australia Pty Limited, North Ryde (AU)

(72) Inventors: Allon Englman, Las Vegas, NV (US); Gary Penacho, Henderson, NV (US); Brian Johnson, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/506,054

(22) Filed: Nov. 9, 2023

(65) Prior Publication Data

US 2024/0071175 A1 Feb. 29, 2024

Related U.S. Application Data

(63) Continuation of application No. 17/822,082, filed on Aug. 24, 2022, now Pat. No. 11,854,345, which is a (Continued)

(51) Int. Cl.
*G07F 17/34* (2006.01)
*G07F 17/32* (2006.01)

(52) U.S. Cl.
CPC ...... *G07F 17/3244* (2013.01); *G07F 17/3213* (2013.01); *G07F 17/3262* (2013.01); *G07F 17/34* (2013.01)

(58) Field of Classification Search
CPC ... G07F 17/3244; G07F 17/34; G07F 17/3213
See application file for complete search history.

(56) References Cited

U.S. PATENT DOCUMENTS 6,224,443 B1 5/2001 Mehrmann
6,471,208 B2 10/2002 Yoseloff
(Continued)

FOREIGN PATENT DOCUMENTS

EP 649671 A1 4/1995
JP 3210172 A 9/1991
(Continued)

OTHER PUBLICATIONS

Office Action (Non-Final Rejection) dated Dec. 15, 2021 for U.S. Appl. No. 16/557,279 (pp. 1-14).
Gizmodo.com; "AUO Curved Displays, Ultra Thin LCDs on the Way"; May 20, 2008; retrieved from <http://gizmodo.com/392248/auo-curved-displays-ultra-thin-lcds-on-the-way> on Mar. 3, 2017 (2 pages).
PC World; "AU Optronics Shows off Curved LCD Screen"; May 20, 2008; retrieved from <http://pcworld.com/article.amp.html> (3 pages).
(Continued)

*Primary Examiner* — Omkar A Deodhar
*Assistant Examiner* — Shauna-Kay Hall
(74) *Attorney, Agent, or Firm* — Armstrong Teasdale LLP

(57) ABSTRACT

An electronic gaming machine includes a display device and a game controller configured to initiate a feature game that uses a plurality of mechanical reels and the display device, identify a number of feature game symbols initially available for use during the feature game, display a plurality of symbol columns, each symbol column of the plurality of symbol columns is associated with a reel, perform a spin of the reels, in response to the player initiating the play, distribute the number of feature game symbols into the plurality of symbol columns based on an output of a random number generator, each feature game symbol being displayed in a determined symbol column of the plurality of symbol columns, evaluate an outcome of the feature game based on attributing the feature game symbols to associated reels, and award credit to the player based on the evaluating.

20 Claims, 14 Drawing Sheets

Related U.S. Application Data continuation of application No. 16/557,279, filed on Aug. 30, 2019, now Pat. No. 11,443,591.

(56) References Cited

U.S. PATENT DOCUMENTS

| | | | | |
|---|---|---|---|---|
| D525,664 | S | 7/2006 | Cole | |
| D601,637 | S | 10/2009 | Myers | |
| 8,591,330 | B2 | 11/2013 | Kelly | |
| D706,359 | S | 6/2014 | Wudtke | |
| 10,019,866 | B2 | 7/2018 | Vermaak | |
| D843,465 | S | 3/2019 | Castro | |
| 10,262,501 | B2 | 4/2019 | Satterlie | |
| 2008/0119282 | A1 | 5/2008 | Bennett | |
| 2010/0029369 | A1 | 2/2010 | Pacey | |
| 2012/0015707 | A1 | 1/2012 | Hornik | |
| 2012/0034968 | A1 | 2/2012 | Watkins | |
| 2013/0122988 | A1 | 5/2013 | Guinn | |
| 2014/0194182 | A1 | 7/2014 | Young | |
| 2015/0050984 | A1* | 2/2015 | Hegde | G07F 17/3267 463/20 |
| 2016/0093142 | A1 | 3/2016 | Lamb | |
| 2016/0093172 | A1 | 3/2016 | Kitamura | |
| 2016/0335854 | A1 | 11/2016 | Kitamura | |
| 2017/0228976 | A1 | 8/2017 | Chesworth | |
| 2018/0130304 | A1* | 5/2018 | Berman | G07F 17/3241 |
| 2018/0130308 | A1 | 5/2018 | Berman | |
| 2019/0066445 | A1 | 2/2019 | Satterlie | |
| 2019/0073872 | A1 | 3/2019 | Berman | |
| 2019/0392675 | A1 | 12/2019 | Humphrey | |

FOREIGN PATENT DOCUMENTS

| | | | |
|---|---|---|---|
| KR | 101113734 | B1 | 2/2012 |
| KR | 102012051630 | A | 5/2012 |
| KR | 101268471 | B1 | 6/2013 |
| KR | 101278904 | B1 | 6/2013 |
| KR | 101336677 | B1 | 12/2013 |
| KR | 101381609 | B1 | 4/2014 |
| KR | 101381610 | B1 | 4/2014 |
| KR | 102015013987 | A | 2/2015 |
| KR | 101539221 | B1 | 7/2015 |
| TW | 200949775 | A | 12/2009 |

OTHER PUBLICATIONS

Office Action (Notice of Allowance and Fees Due (PTOL-85)) dated Apr. 28, 2022 for U.S. Appl. No. 16/557,279 (pp. 1-8).

Denison; "Why can't you buy a flat OLED yet? The curve isn't just about viewing experience"; Digital Trends; Aug. 18, 2013; retrieved from <http://digitaltrends.com/home-theater/why-did-the-us-get-stuck-with-curved-oled#lzXypT> (8 pages).

Snider; "Sony tosses latest pitch for curved TV displays"; USA Today; Oct. 15, 2013; retrieved from <http://www.usatoday.com/story/tech/personal/2013/10/15/new-curved-sony-led-hdtv/2982051/> (2 pages).

Matthias; "Curved TV—Overview"; Curved TV Test; Apr. 20, 2016; retrieved from <https://technikblog.net/fernseher-test/curved-tv/> (16 pages, in German).

AU Optronics Corp.; News Center: "AUO Announces Multiple Upcoming Innovations"; Oct. 27, 2008; retrieved from <http://www.auo.com/?sn=107&lang=en-US&c=10&n=363> on Mar. 3, 2017 (2 pages).

Daniel; "Curved Monitors-Overview"; Curved Monitor Test; Aug. 28, 2015; retrieved from <http://www.curved-monitor-test.de/> (5 pages).

DigiTimes Inc.; "FPD China 2009: AUO 8.9-inch convex display panel"; Mar. 12, 2009; retrieved from <http://www.digitimes.com/photogallery/showphoto.asp?ID=3376> on Mar. 3, 2017 (3 pages).

Morrison; "Curved OLED HDTV screens are a bad idea (for now)"; CNET; Jun. 18, 2013; retrieved from <https://www.cnet.com/news/curved-oled-hdtv-screens-are-a-bad-idea-for-now/> (9 pages).

Shah; "LG Phillips LCD develops world's highest resolution 14.3-inch flexible color E-paper display!"; NewLaunches; Jan. 3, 2008; retrieved from <http://newlaunches.com/archives/lgphilips_lcd_develops_worlds_highest_resolution_143inch_flexible_color_epaper_display.php> (4 pages).

Notice of Allowance dated Jun. 4, 2020 for U.S. Appl. No. 29/723,448 (pp. 1-10).

Office Action dated Apr. 28, 2023 for U.S. Appl. No. 17/822,082 (pp. 1-12).

Office Action (Notice of Allowance and Fees Due (PTOL-85)) dated Sep. 8, 2023 for U.S. Appl. No. 17/822,082 (pp. 1-8).

* cited by examiner

SYSTEMS AND METHODS FOR SUPPLEMENTING A WAGERING GAME

CROSS REFERENCE TO RELATED APPLICATIONS

The present application is a continuation of U.S. patent application Ser. No. 17/822,082, filed Aug. 24, 2022, which is a continuation of and claims priority to U.S. patent application Ser. No. 16/557,279, filed Aug. 30, 2019, which is related to U.S. patent application Ser. No. 29/703,817, filed Aug. 29, 2019, the disclosures of which are hereby incorporated by reference in their entirety.

TECHNICAL FIELD

The field of disclosure relates generally to electronic gaming, and more particularly to electronic gaming systems and methods for supplementing a wagering game.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other trigger conditions in the base game. Secondary games provide an opportunity to win additional game instances, credits, awards, jackpots, progressives, etc. Awards from any winning outcomes are typically added back to the credit balance and can be provided to the player via a printed "ticket" upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

In conventional slot style games, a set of base reels are typically spun and stopped to reveal a set of symbols. These symbols are then evaluated to determine whether the player has won, as well as a win value for the spin. In some gaming devices, such as with some mechanical reel games, the symbols appearing on the set of reels are fixed. As such, the outcome options are limited based on the stop positions of the reels. What is needed is a way to supplement the reels with additional symbols.

SUMMARY

In one aspect, an electronic gaming machine is provided. The electronic gaming machine includes a display device, a player input device, a credit input mechanism configured to receive a credit wager, a storage medium having instructions stored thereon including a communal game client configured to communicate with a communal gaming server, and a game controller configured to execute instructions stored in a tangible, non-transitory, computer-readable storage medium. When executed by the game controller, the instructions cause the game controller to initiate game play of a feature game based on an outcome of a base game. The feature game uses a plurality of mechanical reels and the display device. The instructions also cause the processor to identify a number of feature game symbols initially available for use during each play of the feature game. The instructions further cause the processor to display a plurality of symbol columns on the display device. Each symbol column of the plurality of symbol columns is associated with a reel of the plurality of mechanical reels. The instructions also cause the processor to perform a spin of the plurality of mechanical reels in response to the player initiating a play of the feature game, the spin resulting in a primary play area from the plurality of mechanical reels. The instructions further cause the processor to, in response to the player initiating the play, distribute the number of feature game symbols into the plurality of symbol columns based on an output of a random number generator. Each feature game symbol is displayed in a determined symbol column of the plurality of symbol columns. The instructions also cause the processor to evaluate an outcome of the play of the feature game based at least in part on attributing the feature game symbols to their associated reels. The instructions further cause the processor to award credit to the player based on the evaluating.

In another aspect, a non-transitory computer-readable media containing instructions embodied thereon is provided. When executed by at least one processor, the instructions cause the at least one processor to initiate game play of a feature game of an electronic gaming machine based on an outcome of a base game. The feature game activates a plurality of mechanical reels and a display device. The instructions also cause the at least one processor to determine, based on a first random number generator (RNG) output from an RNG, a number of feature game symbols initially available for each play of the feature game. The instructions further cause the at least one processor to determine, based on a second RNG output from the RNG, placement of the number of feature game symbols across a plurality of symbol columns to be displayed on the display device. The instructions also cause the at least one processor to evaluate an outcome of the play of the feature game based at least in part on attributing the feature game symbols to their associated reels. The instructions further cause the at least one processor to award credit to the player based on the evaluating.

In yet another aspect, a method of supplementing a plurality of mechanical reels of an electronic gaming machine with graphical content on a display device is provided. The method includes displaying spinning a wheel in a feature game based on an outcome of a base game on an electronic gaming device, the feature game provides a plurality of mechanical reels and a display device. The method also includes presenting a number of feature game symbols initially available for use during each play of the feature game on the wheel. The method further includes displaying a plurality of symbol columns on the display device, each symbol column of the plurality of symbol columns is associated with a reel of the plurality of mechanical reels. The method also includes spinning the plurality of mechanical reels in response to the player initiating a play of the feature game. The spin results in a primary play area from the plurality of mechanical reels, including one or more feature game symbols being displayed in the primary play area. The method further includes animating the distribution of the number of feature game symbols into the plurality of symbol columns. The method also includes presenting an outcome of the play of the feature game based at least in part on attributing the feature game symbols in the plurality of symbol columns to their associated reels and in combination with the one or more feature game symbols in the primary play area. The method further includes awarding credit to the player based on the evaluating.

BRIEF DESCRIPTION OF THE DRAWINGS

An example embodiment of the subject matter disclosed will now be described with reference to the accompanying drawings.

DETAILED DESCRIPTION

Figure 1:
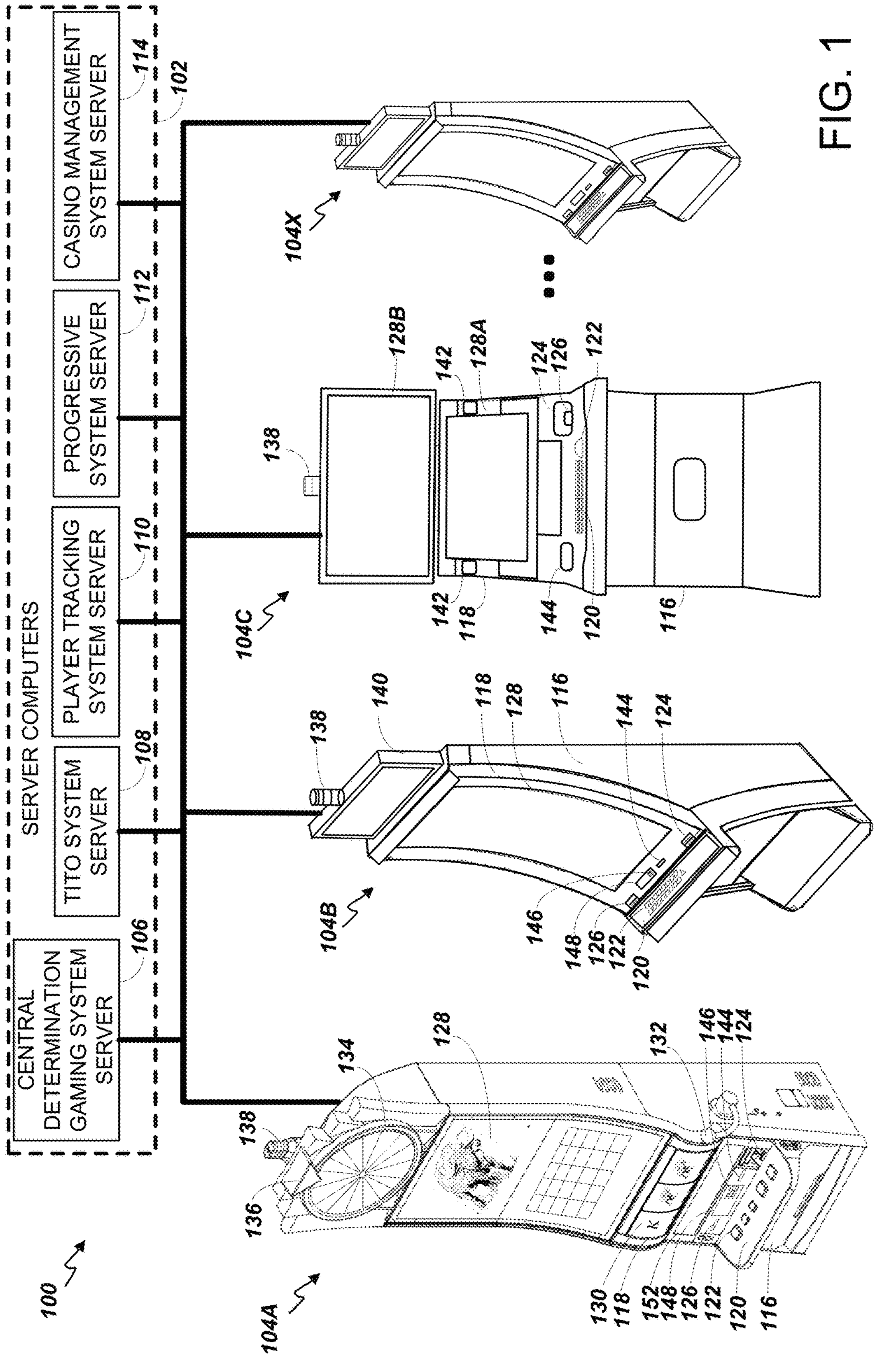
FIG. 1 is a diagram of exemplary EGMs networked with various gaming-related servers.

A gaming system, electronic gaming machine ("EGM"), and associated methods are described herein that provide a feature-rich, event-triggered, multi-component slot-style game (or just "game") that improves machine utilization and enhanced player experience. In example embodiments, the EGM utilizes mechanical reels (e.g., "stepper reels") with fixed-symbol reel strips that may be augmented during feature game play by symbols appearing on a display device above the physical reels. As such, virtual symbols may be displayed on the display device to augment symbols appearing on the physical reels, thereby augmenting the physical reels with virtual symbols in a hybrid physical/virtual EGM.

In example embodiments, the gaming system provides a feature game that is activated during play of a base slot-style game ("base game"). Upon initial feature game activation (e.g., activation symbols appearing on reels 1, 2, and 3), the player is initially awarded a number of feature game symbols. For example, upon activation of the feature game, the EGM awards the player a number of free spins for the feature game and performs an initial spin of a feature game wheel appearing at the top of the EGM. The feature game wheel includes multiple wheel spots that identify various numbers of feature game symbols that may be awarded to the player during feature game play (e.g., "1 feature game symbol", "2 feature game symbols", "3 feature game symbols", and so forth). The wheel may also have one or more spots that award progressive jackpots or other credit values. When the spin result indicates a progressive jackpot or credit value result, the player is awarded the progressive jackpot and the feature game concludes and returns to base game play. When the spin result indicates a number of feature game symbols, the EGM awards the identified number of feature game symbols to the player and continues into feature game play with the player being awarded a number of free spins for the feature game.

Feature game play, in the example embodiment, utilizes a set of game reels (e.g., mechanical reels) for a primary play area of the EGM (e.g., five reels displaying four positions per reel after each spin). The feature game also presents a secondary play area on a display device above the game reels. The secondary play area includes multiple symbol columns, one symbol column above each game reel. The symbol columns are used to display the number of awarded feature game symbols during game play. More specifically, upon each feature game spin, the game reels are spun and stopped. In addition, during each feature game spin, the symbol columns are cleared and the number of awarded feature game symbols are then distributed amongst the five symbol columns. For example, when the player has been awarded four feature game symbols, the EGM distributes four feature game symbols (e.g., randomly) amongst the five symbol columns. In some situations, multiple feature game symbols may appear in the same symbol column, stacking on top of each other to illustrate to the player that multiple feature game symbols apply to that reel, where some symbol columns may have no feature game symbols appearing.

The feature game symbols are symbols that may appear on the game reels (e.g., within the primary play area) and may also appear within the symbol columns above any or all of the game reels. In example embodiments, feature game symbols are evaluated from left to right as a ways evaluation (e.g., a "Reel Power" evaluation), generating win amounts when one or more feature game symbols are present for two or more of the left-most reels (e.g., "2-of-a-kind" being at least one symbol on the left two reels, "3-of-a-kind" being at least one symbol on each of the left three reels, and so forth) and generating multipliers on a given reel based on the number of symbols appearing (e.g., "1×" when only one symbol appears, "×2" when two symbols appear, and so forth). More specifically, for each reel, the EGM determines a total number of feature game symbols appearing on that reel as well as in the symbol column above the reel. As such, when the EGM evaluates a spin result, the feature game symbols distributed on the symbol columns above the reels are used to supplement the feature game symbols appearing on their respective reels, thereby allowing both additional occurrences of feature game symbols in the various columns (e.g., thereby making reels more regularly have at least one feature game symbol) as well as higher feature game symbol totals than would naturally appear on the reels themselves (e.g., thereby generating higher potential numbers of feature game symbols on each reel). Accordingly, when reel strips of the reels are fixed, the display device may be used to supplement the fixed reel strips.

In some embodiments, the wagering game may also provide multiplier symbols within the reels. Multiplier symbols, in example embodiments, act as wild symbols, and further act as multipliers (e.g., "×1", "×2", "×3") to wins when they appear. For example, during evaluation of a spin outcome, when the player wins a particular amount and also has one or more multiplier symbols appearing within the spin result, the win amount is multiplied a certain number of times based on the multiplier symbol(s) that appear. However, with fixed mechanical reels, the symbols appearing on the reel strips are fixed. In example embodiments, the EGM provides backlit reels that allow a fixed multiplier symbol to be backlit with different colors, where each color indicates a different multiplier factor (e.g., a first color for "×1", a second color for "×2", and a third color for "×3"). As such, the EGM allows for variability in the multiplier symbols for the fixed reels. Further, to enhance the significance of these multiplier symbols, the wagering game displays a multiplier symbol panel on the display device above the reels. When a multiplier symbol appears on one of the reels in a spin outcome, the wagering game additionally displays the multiplier symbol and appropriate color in a multiplier symbol panel above the associated reel. Further, the wagering game may also display a multiplier value in the multiplier symbol panel identifying the multiplier for that symbol, thereby improving player understanding of the significance of the multiplier symbols.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
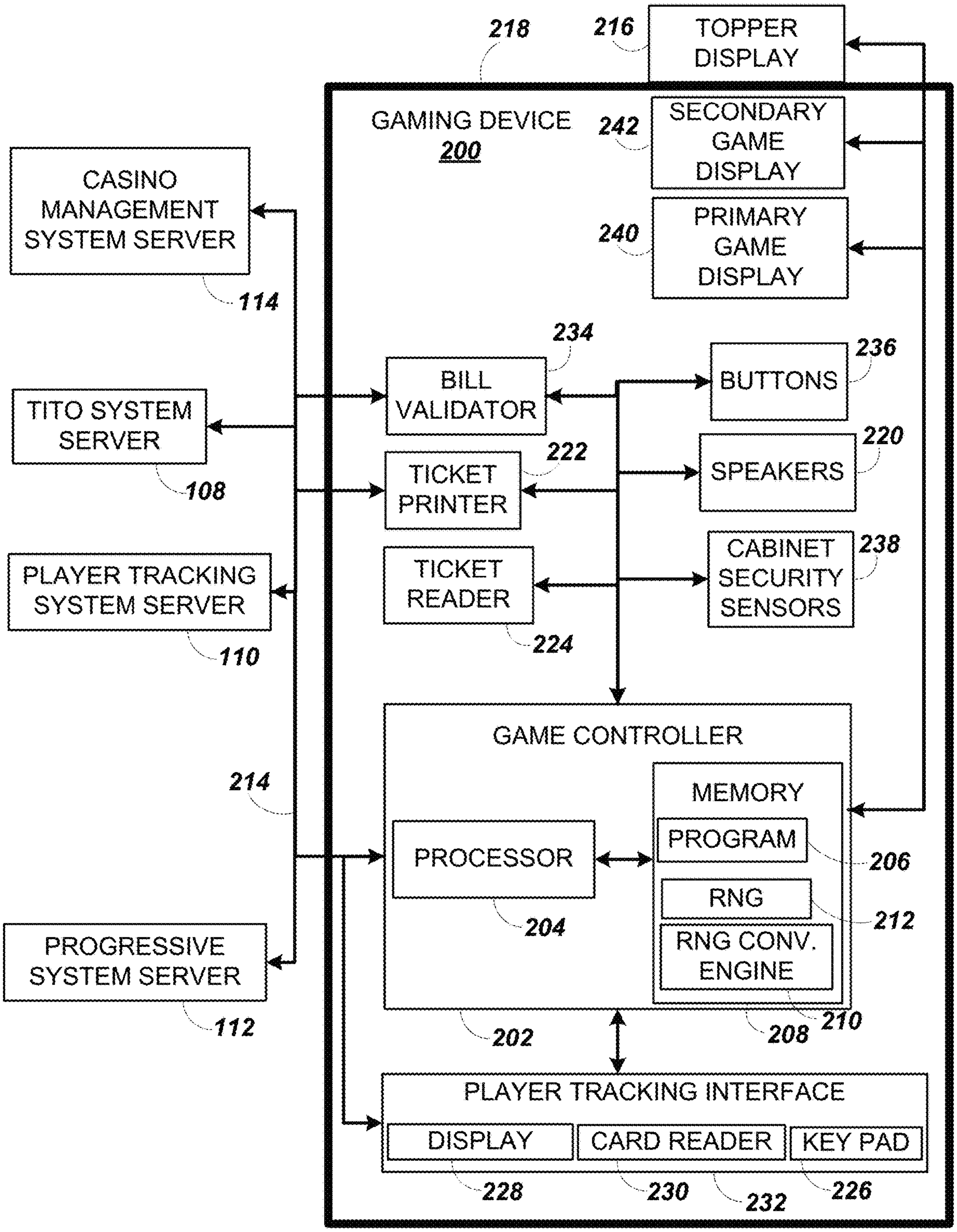
FIG. 2 is a block diagram of an exemplary EGM.

Many or all the above described components can be controlled by circuitry (e.g., a gaming controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc. In some embodiments, some gaming devices 140 may be configured as bar top gaming devices (not shown in FIG. 1).

In an example embodiment, a wagering game is provided on a gaming device 104, such as the Relm XL™, that uses a set of mechanical reels. Further, the wagering game is also supplemented by a display device (e.g., secondary display 128B) positioned above the reels. The wagering game may also be supplemented by a physical wheel (e.g., bonus topper wheel 134) or a virtual wheel presented on the display device. During game play, the display device may display symbol columns above each of the mechanical reels and may distribute a number of feature game symbols into the symbol columns (e.g., during feature game play).

In some embodiments, one or more mechanical reels may include interior lights of differing colors that can add a color to particular positions of the exposed reel strip. For example, reels 2, 3, and 4 of a 3×5 play area (e.g., five reels three high) may include interior lights for three different colors of a multiplier symbol, with each color corresponding to either "×1", "×2", or "×3." When a multiplier symbol results on one of the reels, the gaming device 104 may determine (e.g., randomly, based on distribution lookup table, or such) which multiplier to present in the spin result. Based on which multiplier is identified, the gaming machine 104 may then light the appropriate interior light to indicate to the player which multiplier is associated with that reel. As such, while the reel strips may be fixed, the interior lighting allows the gaming device 104 to assign varying multipliers to those multiplier symbols. These multiplier symbols may be replicated on a digital display to enhance player understanding, as described in greater detail below.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and non-volatile memory and other types of non-transitory data storage components. Volatile memory is memory that do not retain data values upon loss of power. Non-volatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 208 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

In some jurisdictions, one regulatory requirement for games running on gaming device 200 may include complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes a random number generator (RNG) 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. Game developers could vary the degree of true randomness for each RNG (e.g., pseudorandom) and utilize specific RNGs depending on game requirements.

Another regulatory requirement for running games on gaming device 200 may include ensuring a certain level of return to player (RTP). Similar to the randomness requirement discussed above, numerous gaming jurisdictions also mandate that gaming device 200 provides a minimum level of RTP (e.g., RTP of at least 75%). FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

In an example embodiment, the gaming device 200 includes a set of mechanical reels (not shown) operating in conjunction with the secondary game display 242, and optionally the bonus topper wheel 134, to supplement game play of a base game and a feature game. The mechanical reels may present fixed reel strips upon which feature game symbols and activation symbols may appear. The wagering game provided by the game controller 202 may display symbol columns or a multiplier symbol panel on the secondary game display 242 and may also display feature game symbols on the secondary game display 242 (e.g., cascading down into the symbol columns).

Figure 3:
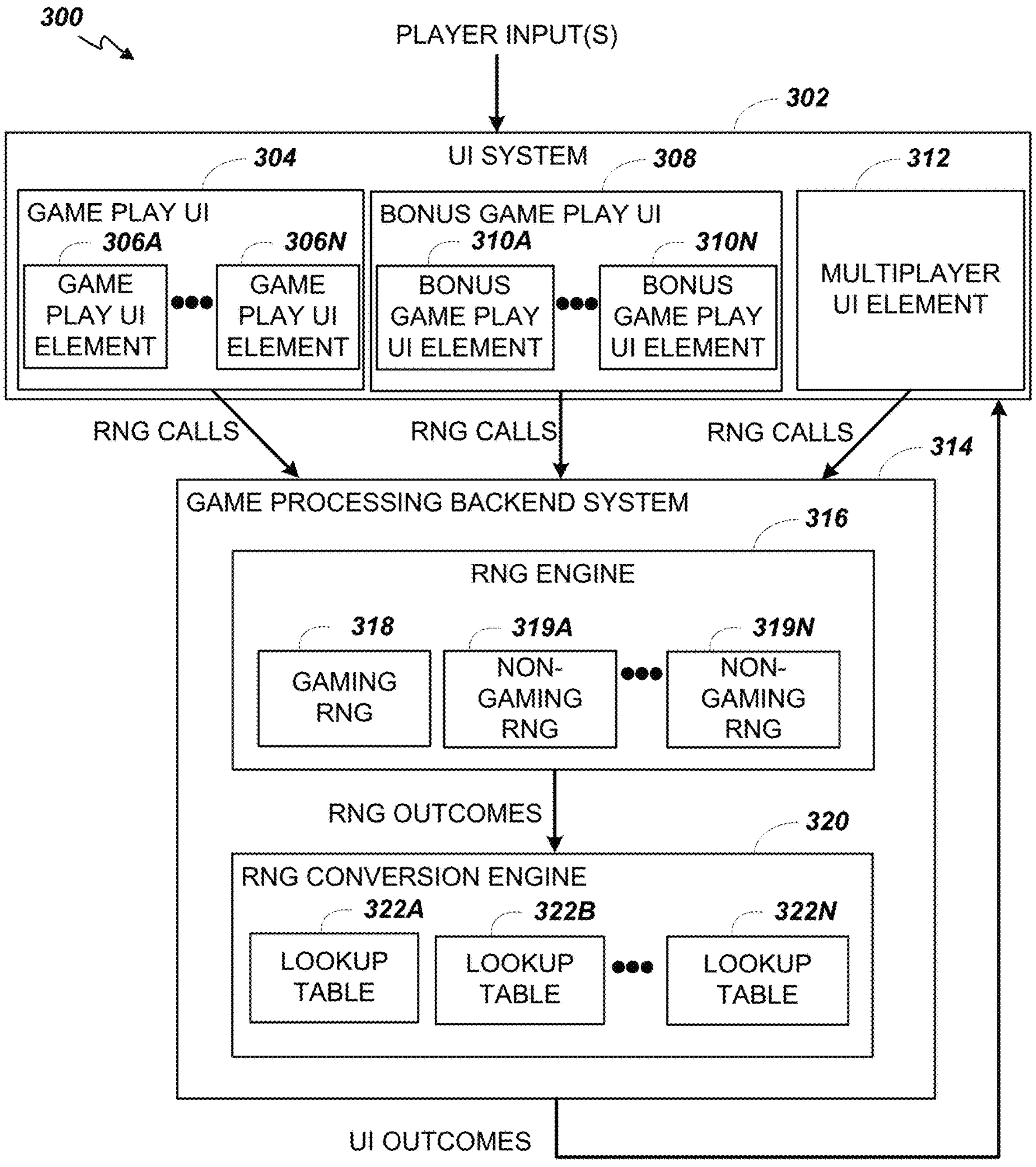
FIG. 3 illustrates, in block diagram form, an embodiment of a game processing architecture that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. In the example embodiment, the game processing architecture 300 may be provided on the gaming devices 104, 200 (e.g., by game controller 202). As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from to the bonus game play UI elements 310A-310N.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computational less expensive. Non-gaming RNGS 319A-319N can, thus, be used to generate outcomes for non-gaming purposes. As an example, non-gaming RNGs 319A-319N can generate random numbers for such as generating random messages that appear on the gaming device. The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N (which are also referenced herein as weighted tables) to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to the updating the appropriate UI, the player may subsequently provide additional player inputs to initiate a subsequent game instance that progresses through the game processing pipeline.

In the example embodiment, the game processing backend system 314 provides RNG calls and outcomes for various game features described herein. For example, the game processing backend system 314 provides UI outcomes for reel stops for the base game and feature game (e.g., for mechanical reels). The game processing backend system 314 includes lookup table(s) (e.g., lookup table 322) for additional RNG calls to determine when multiplier symbols appear and the value of the multiplier. The game processing backend system 314 includes a lookup table (e.g., lookup table 322B) that is weighted for each number of feature game symbols (e.g., from one to ten symbols, for a total of ten tables) and provides UI outcomes from additional RNG calls to determine how to distribute that number of feature game symbols during feature game play.

Figure 4:
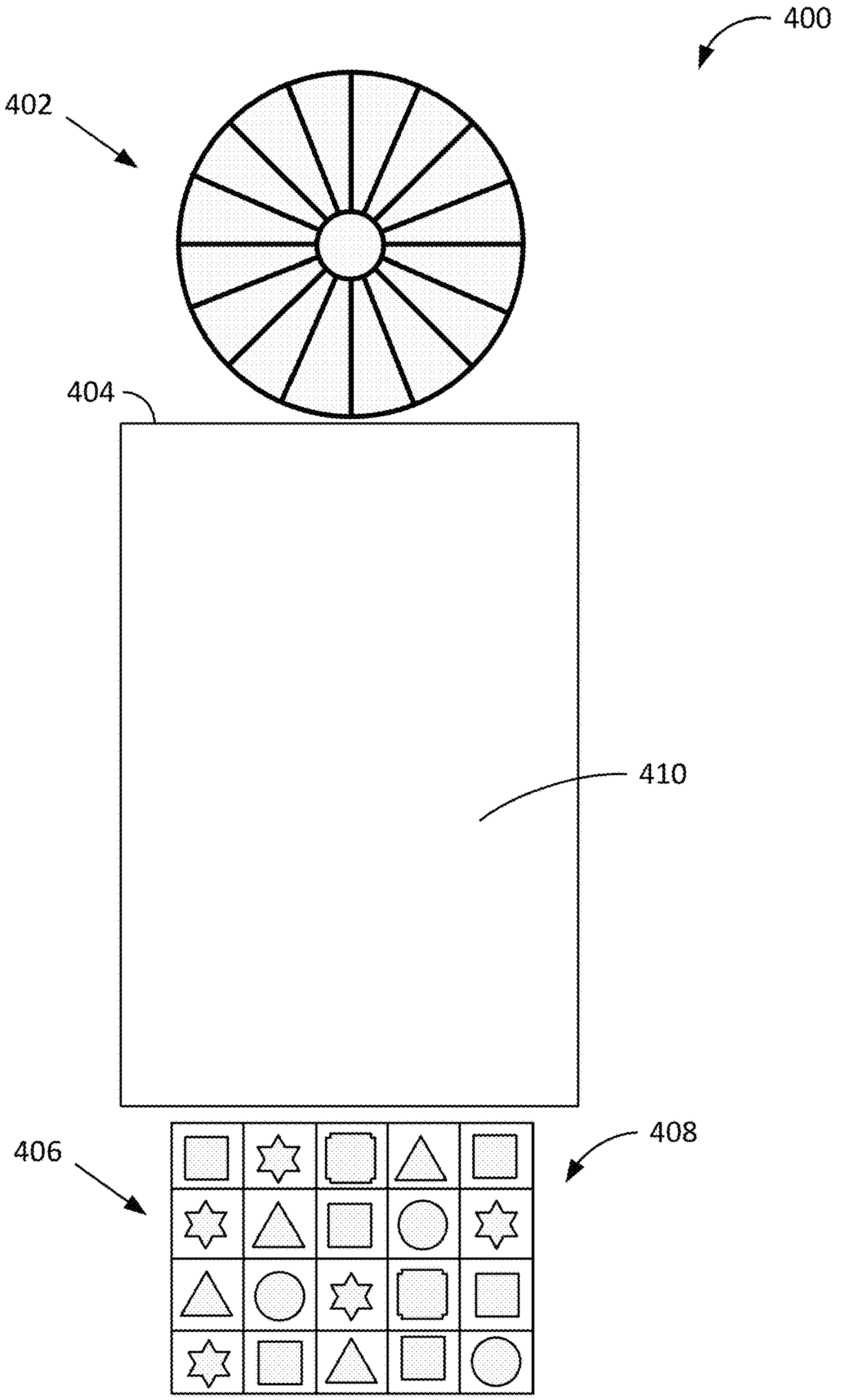
FIG. 4 is a diagram illustrating a primary play area of an example multi-component slot game.

FIG. 4 illustrates components of an example gaming device 400 that is configured to provide a base wagering game that is played on a plurality of reels 406 and supplemented using a secondary display device 404 and a feature game wheel 402. In the example embodiment, the gaming device 400 uses the plurality of reels (or just "reels") 406 during play of the base wagering game (or just "base game") and, when activated, during play of a feature game. The reels 406 are mechanical reels that can be controlled by stepper motors and configured to spin and stop at a set number of predefined positions. In other embodiments, the gaming device 400 can use other types of motors on reels 406. Each of the individual reels 406 includes a static set of symbols (e.g., a reel strip). When the reels 406 are spun and stopped (e.g., based on an output of the RNG 212), the reels 406 present a matrix of symbols that represent a primary play area 408.

The primary play area 408 is used, at least in part, to evaluate whether and how much the player is awarded for that spin (e.g., an award amount for the round of play). In the example shown here, five reels 406 are used, and four contiguous symbols are displayed from each reel 406 after the spin. In other words, the primary play area 408 presents a 4 by 5 matrix of symbols. The symbols on the reels 406 may be any shape, size, type, color, and so forth. In some embodiments, the symbols may be animated, may appear to be 3-dimensional, or may be configured for partial or complete augmented reality and/or virtual reality display. In the example embodiment, the exemplary game presents a consistent theme throughout the course of the game play. For example, the theme may be an animal theme, a party theme, a music theme, or any other category of captivating entertainment. Consistency of the theme may include the use of similar and/or related animations and symbols during and throughout the game play. Game play may occur in multiple phases including a base and a secondary game (or "feature game"). Initially, game play begins with the base game. The base game periodically displays, as part of the game play, special theme-based symbols. The feature game is triggered by a combination of the trigger symbols appearing on the primary play area 408. In the example embodiment, when three of the trigger symbols appear, the feature game is launched.

During operation, the secondary display device 404 may be used to supplement the play of the base game or the feature game by displaying various graphical components in a secondary play area 410 (e.g., a digital display device). In some embodiments, gaming device 400 may be similar to gaming devices 104, 200, secondary display device 404 may be similar to secondary game display 240, and feature game wheel 402 may be similar to bonus topper wheel 134.

Figure 5:
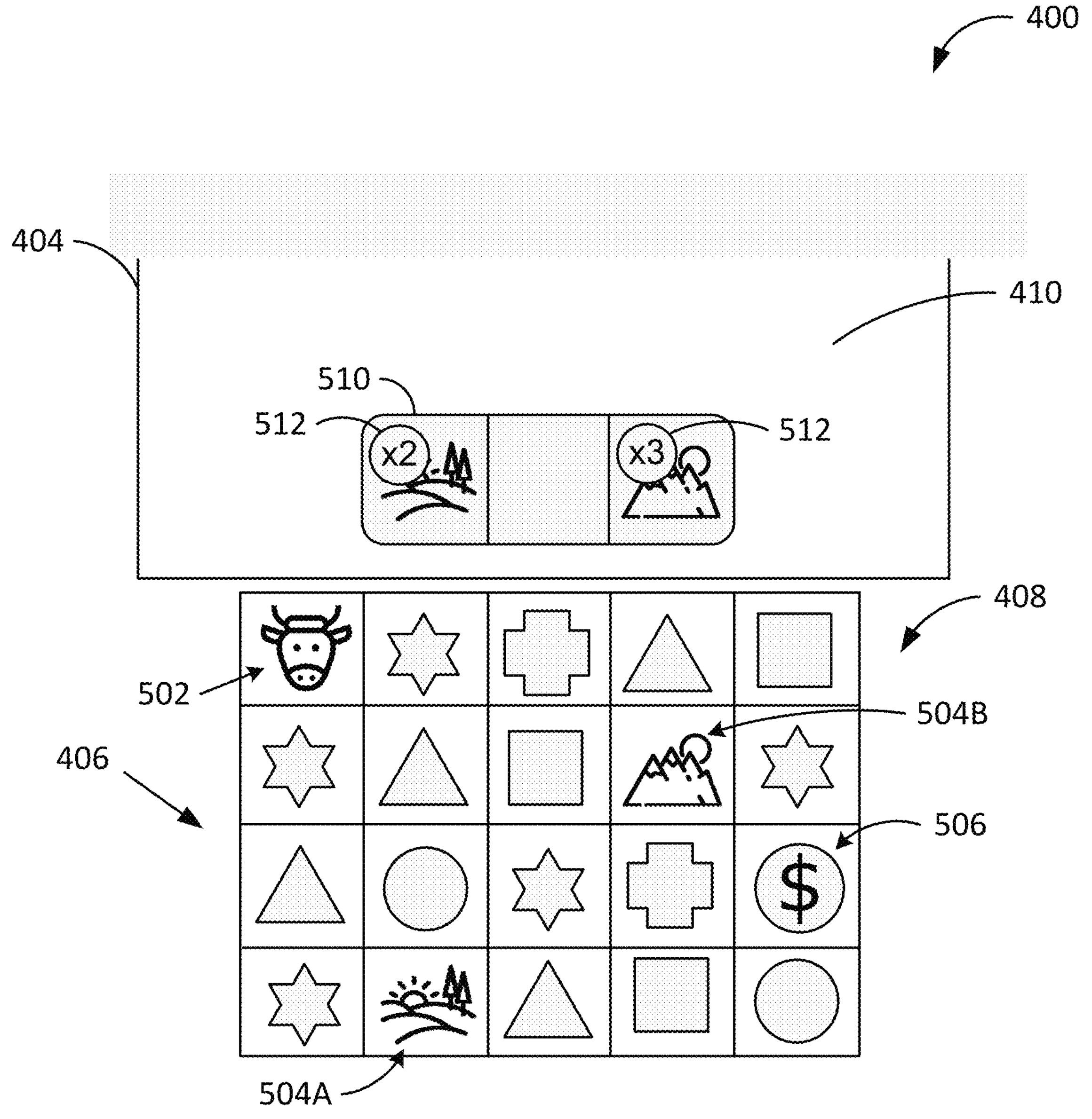
FIG. 5 is a diagram illustrating the secondary play area of the example multi-component slot game.

FIG. 5 illustrates some features of the example base game in which the secondary display device 404 and secondary play area 410 are used to supplement the game play experience of the base game. In some embodiments, the reels 406 include various conventional symbols, as well as several types of symbols significant to the present disclosure. In the example embodiment, the reels 406 include feature game symbols 502 (e.g., buffalo symbols), multiplier symbols 504A, 504B (collectively, "multiplier symbols 504") (e.g., sunset-themed symbols or some other symbol or symbols associated with multiplier bonuses), and feature activation symbols (or just "activation symbols") 506 (e.g., coin symbols). During base game play, feature game symbols 502 appearing in the primary play area 408 are evaluated to determine whether the spin resulted in an award amount for the player. Feature game symbols 502 are resolved based on the quantity of feature game symbols 502 appearing for each reel and on two or more contiguous reels from the left-most reel. Feature game symbols 502 appearing on the reels 406 may be supplemented with additional feature game symbols 502 during the feature game, as described in greater detail below. Multiplier symbols 504 apply a multiplication factor to any win results generated by the spin. In some embodiments, the gaming device 400 may apply on the highest appearing multiplier to all winning outcomes (e.g., only the "×3"). In other embodiments, the gaming device 400 may apply all of the multipliers appearing in the spin result (e.g., both the "×2" and "×3" multipliers, for a total of "×6" to each win result). Activation symbols 506 function to trigger activation of the feature game, as described in greater detail below.

During play of the base game, some spin results may include one or more multiplier symbols 504, such as shown in FIG. 5. Some players may not recognize that certain symbols are multiplier symbols, may not know which symbols represent which particular multipliers, or may not otherwise appreciate the nature of multiplier symbols. As such, to improve player experience and understanding, the gaming device 400 displays a multiplier symbol panel 510 in the secondary play area 410. In the example embodiment, multiplier symbols 504 appear only on the middle three reels (e.g., reels two, three, and four, counting left to right). When any multiplier symbol 504 appears in a spin result, the gaming device 400 displays the particular multiplier symbol 504 within the multiplier symbol panel 510 and above the particular reel 406 where the symbol 504 appeared. When no multiplier symbols appear for a given reel 406, the associated space in the multiplier symbol panel 510 remains blank. In this example, multiplier symbol 504A shows a sunset behind hills and trees and represents a "×2" multiplier bonus, and multiplier 504B shows a sunset behind snow-covered mountains and represents a "×3" multiplier bonus. In some embodiments, the gaming device 400 may also overlay a multiplier icon 512 in the multiplier symbol panel 510 and over the multiplier symbol 504 to highlight the particular multiplier bonus associated with that multiplier symbol 504, thereby highlighting both the occurrence of multiplier symbols in the spin result as well as what multiplication factor(s) will be applied to any win results.

The example shown in FIG. 5 illustrates multiple different multiplier symbols 504A, 504B (e.g., different symbols for "×1", "×2", and "×3"). In some embodiments, the reels 406 may include a single multiplier symbol that is back-lit with different lighting (e.g., different color lights) to represent the different multipliers. For example, in one embodiment, the reels 406 may include the sunset multiplier symbol 504A at various positions on reels 2, 3, and 4, and may also include interior lighting that can illuminate any of the visible positions of reels 2, 3, and 4 in various colors (e.g., white, blue, orange). During game play, when one or more multiplier symbols 504 are displayed in the primary play area 408 after a spin, the gaming device 400 determines (e.g., based on RNG calls) which multiplier to apply to each visible multiplier symbol 504 and back-lights each multiplier symbol 504 accordingly. Further, the gaming device 400 populates the multiplier symbol panel 510 on the secondary play area 410 with icons matching the determined multiplier.

Figure 6A:
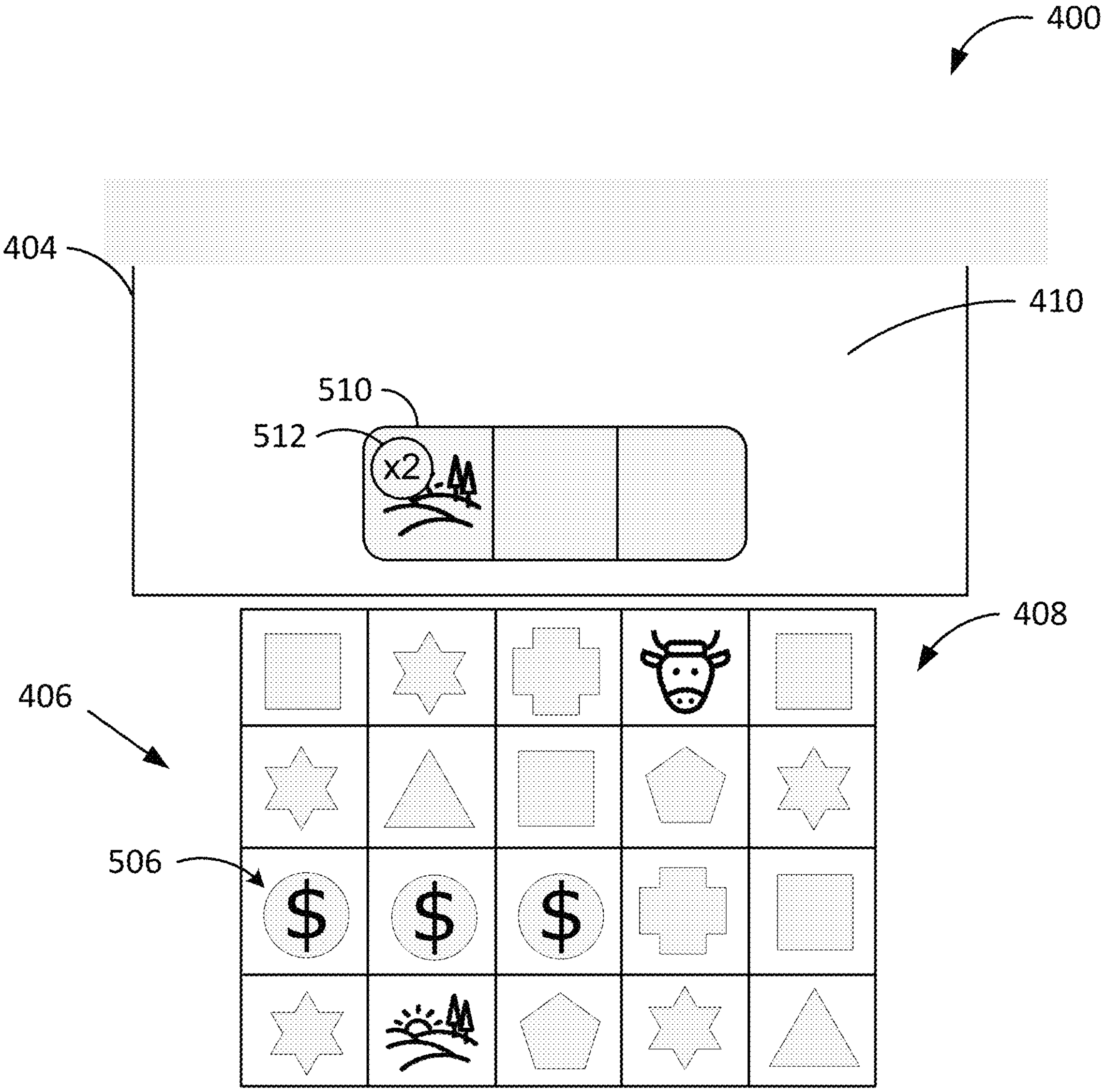
FIG. 6A illustrates a spin result on the reels that activates the example feature game.

FIG. 6A illustrates a spin result on the reels 406 that activates the example feature game. The gaming device 400 provides a feature game that may be activated during play of the base game (e.g., upon particular spin results). In the example embodiment, some or all of the reels 406 include feature game activation symbols 506, and the feature game is configured to activate when three or more activation symbols 506 (e.g., coin symbols) appear in the spin result (e.g., in a pay line, as scatter symbols anywhere on the primary play area 408, or such). It should be understood that any symbol may be used as the activation symbols 506 or the feature game symbols 502, and may be chosen for thematic purpose. In other embodiments, the feature game may be triggered by, for example, a specific number or type of symbols appearing on the primary play area 408, particular patterns of activation symbols 506 appearing on the primary play area 408, or such.

When the player achieves feature game activation, the gaming device 400 may evaluate the spin result for an award amount as normal. In addition, the gaming device 400 determines that three activation symbols 506 appear in the play area 408 and the gaming device transitions into the feature game. In some embodiments, the gaming device 400 may initially award the player a predetermined or random number of free feature game plays (e.g., feature game spins) at the beginning of the feature game. In the example embodiment, the gaming device 400 initially awards the player 8 free plays of the feature game. In addition, the gaming device 400 also initially awards the player a spin of the feature game wheel 402 to determine how the feature game starts for the player.

Figure 6B:
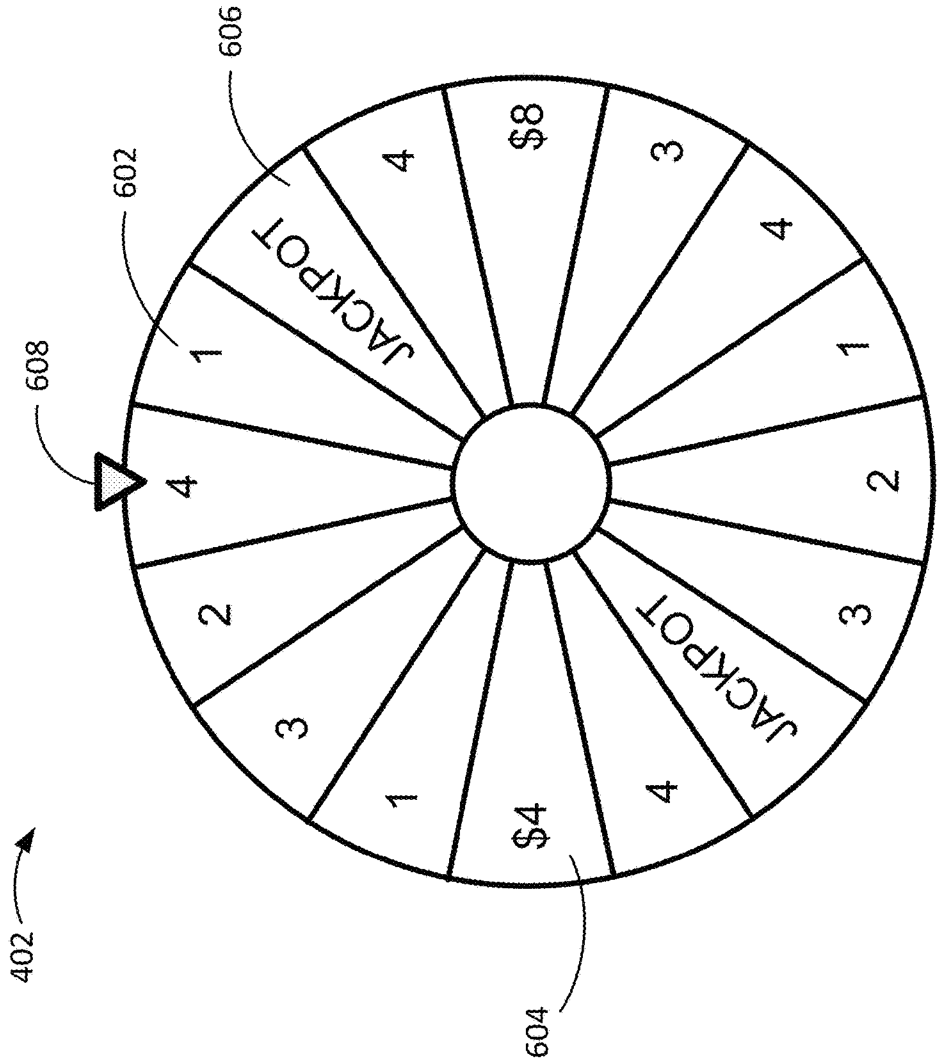
FIG. 6B is a diagram of the example feature game wheel that is used during the feature game.

FIG. 6B is a diagram of the example feature game wheel 402 that is used during the feature game. In the example embodiment, the feature game wheel 402 includes feature symbol wheel spots 602, award value spots 604, and jackpot spots 606. Feature symbol wheel spots 602 award a number of additional feature symbols 502 during each play of the feature game. In FIG. 6B, the number of feature game symbols 502 awarded by each particular feature symbol wheel spot 602 is identified by an integer within the spot 602 (e.g., from 1 to 4 feature game symbols 502). Award value spots 604 award a fixed award value to the player (e.g., a virtual or real currency value). Jackpot spots 606 award a jackpot win to the player (e.g., a progressive mini, minor, major, or grand jackpot).

Initially, the player is awarded a spin of the feature game wheel 402 at the beginning of the feature game (e.g., based on an RNG output determined by the RNG engine 316 shown in FIG. 3). When rotation of the feature game wheel 402 ceases, a wheel indicator 608 identifies which spot the player is awarded from the feature game wheel 402 to begin play. In this example, the wheel spin lands on a feature symbol wheel spot 602 identifying 4 feature game symbols 502. In some embodiments, an RNG output is used to determine whether and how many feature game symbols 502 are awarded by the spin of the feature game wheel. As such, the player begins the feature game with 4 feature game symbols 502 during each play of the feature game. In the example embodiment, if the initial spin lands on one of the award value spots 604 or the jackpot spots 606, the gaming device 400 may award the associated award to the player and continue into feature game play with the player having zero feature game symbols 502 to start. In other embodiments, if the spin lands on one of the award value spots 604 or the jackpot spots 606, the gaming device 400 may award the associated award to the player and subsequently allow another spin of the feature game wheel 402 until the player lands on a feature symbol wheel spot 602.

Figure 7A:
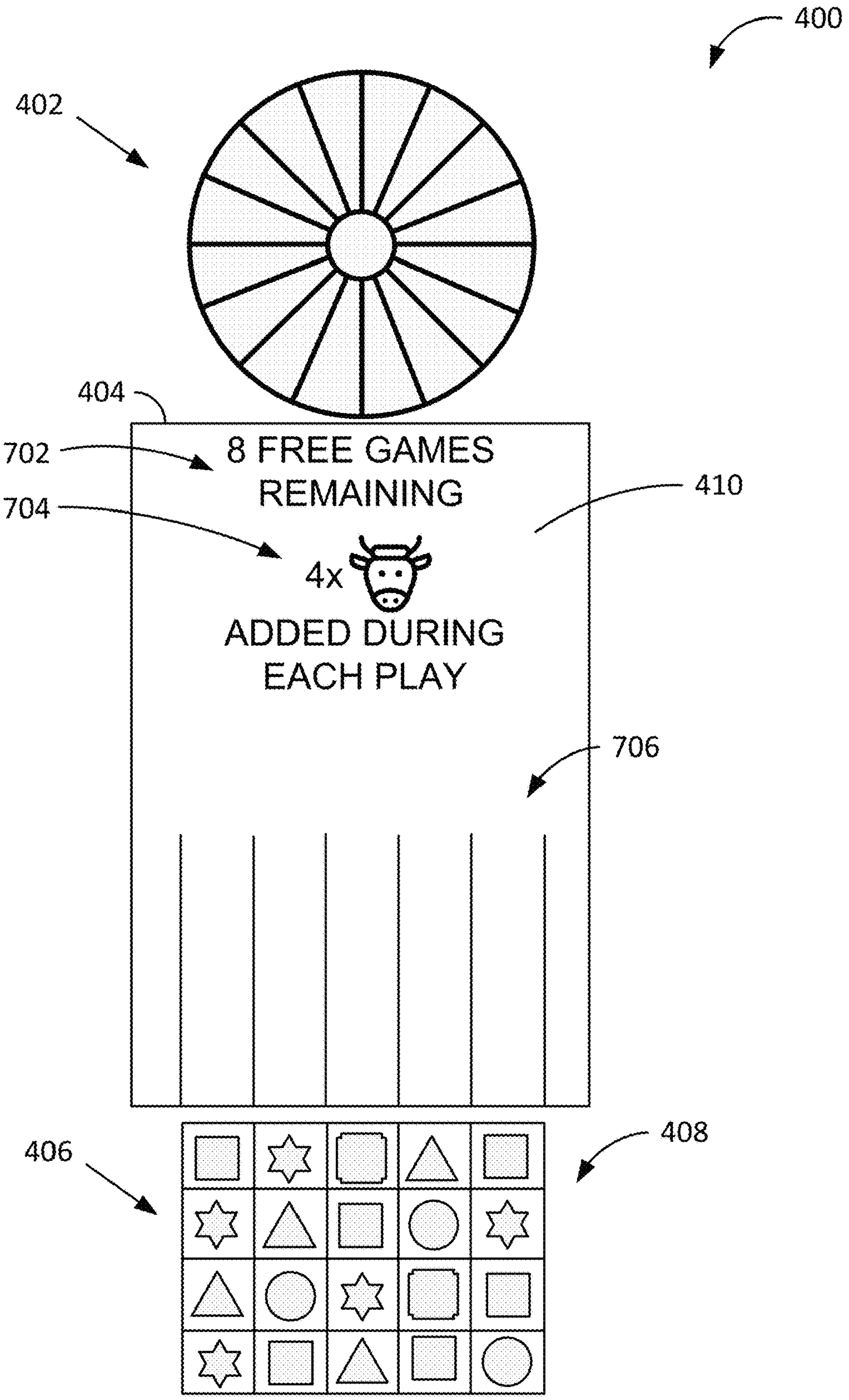
FIG. 7A illustrates an example initial configuration of the feature game on the gaming device.

FIG. 7A illustrates an example initial configuration of the feature game on the gaming device 400. In the example embodiment, upon completion of the initial wheel spin, the gaming device 400 displays a number of remaining free games 702 (e.g., the 8 free games initially awarded) and a number 704 of feature game symbols 502 to be added during each play of the feature game (e.g., the 4 feature game symbols 502 awarded based on the result of the wheel spin shown in FIG. 6B). The gaming device 400 also displays five symbol columns 706 in the secondary play area. Each symbol column 706 is aligned above a particular reel 406 and is associated with that reel 406. During each play of the feature game, the gaming device 400 distributes the number 704 of feature game symbols into the symbol columns 706. Each feature game symbol 502 added to a symbol column 706 is displayed within that symbol column 706, just above the associated reel 406.

Figure 7B:
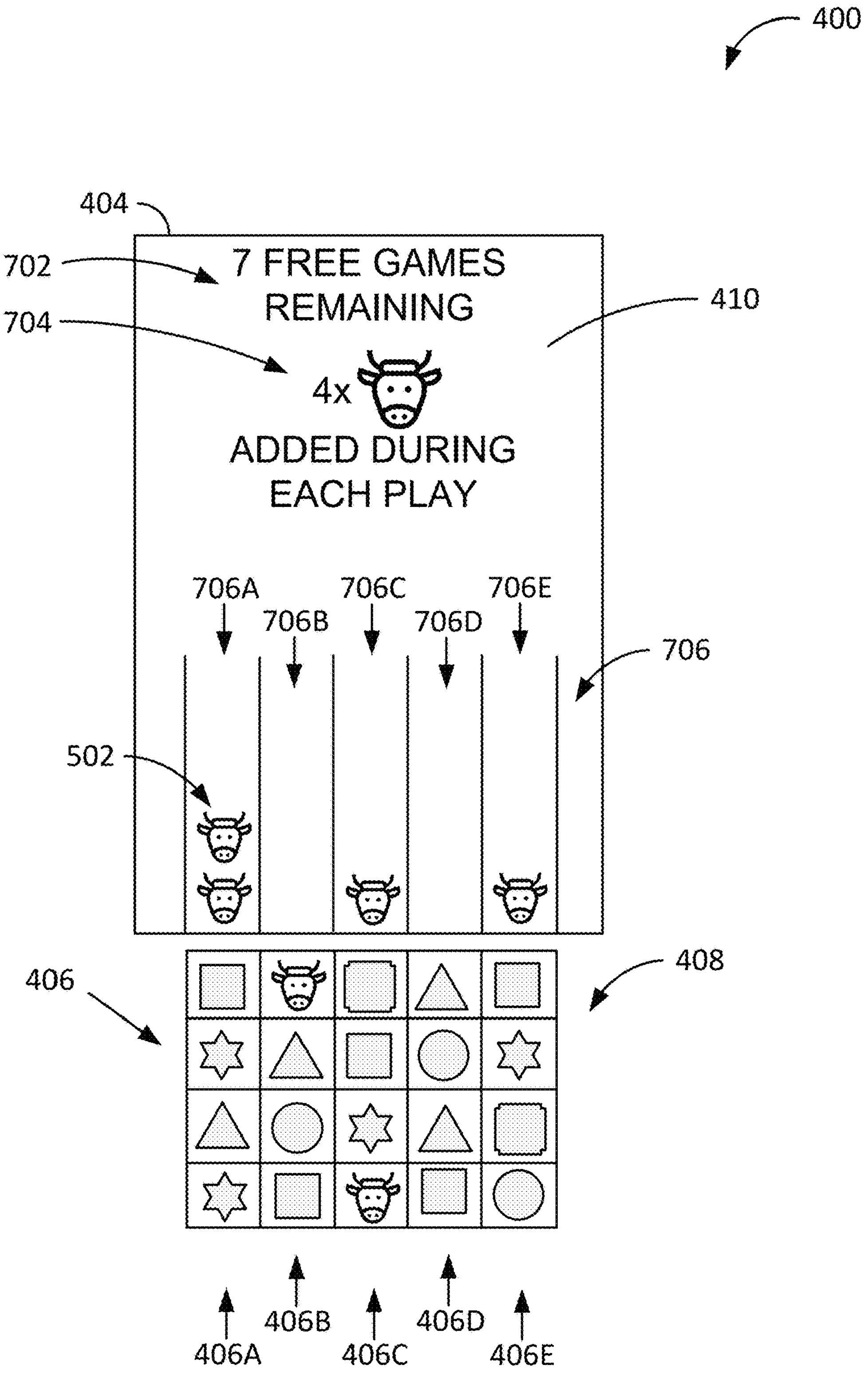
FIG. 7B illustrates example results of a first play of the feature game.

During play of the feature game, the player initiates a free play (e.g., a free spin) of the feature game. FIG. 7B illustrates example results of a first play of the feature game. In the example embodiment, spins begin automatically in the feature game. In some embodiments, the player may be prompted to initiate the beginning of the free plays of the feature game or between each play of the feature game (e.g., via buttons 122). For each awarded spin, the gaming device 400 initiates a spin of the reels 406 in the primary play area 408 while simultaneously displaying, in the secondary play area 410, an animation of feature game symbols 502 descending into the symbol columns 706. The quantity of feature game symbols 502 added to the symbol columns 706 is determined by the current number 704 of feature game symbols. The gaming device 400 determines where each of the feature game symbols 502 will appear in the symbol columns 706. In this example, the gaming device 400 adds two feature game symbols 502 to the first symbol column 706A, one feature game symbol 502 to the third symbol column 706C, and one feature game symbol 502 to the fifth symbol column 706E.

In the example embodiment, the gaming device 400 determines where the current number 704 of feature game symbols 502, n, appear (e.g., in which symbol columns 706) based on an RNG call and a set of distribution lookup tables (e.g., lookup tables 322C, shown in FIG. 3). The gaming device 400 includes one distribution lookup table for each number of feature games symbols within the potential of the game. In this example, the feature game allows up to a maximum, $n_{max}=10$, of feature game symbols 502 to be awarded to the player. As such, the set of distribution lookup tables includes 10 different distribution lookup tables, one for each number 704 of feature game symbols 502, 1 to 10. Each distribution lookup table, $table_n$, is defined for one of the numbers, n, of feature game symbols 502, for each of $1 \leq n \leq n_{max}$. Each $table_n$ includes a row for each of the possible ways of distributing the n feature game symbols into the five symbol columns 706. For example, a row of table t may identify feature game symbol distribution map as (0, 1, 1, 0, 0), where the five entries correspond to the five symbol columns 706, the value of the entry corresponding to the number of feature game symbols, and the sum of all entries is equal to n (e.g., n=2). Further, each row also includes a pre-configured weight (e.g., a probability) of that row being selected during game play. During configuration, the game designers or game operators may configure the weights in the distribution lookup tables (e.g., to favor or disfavor various distributions) to influence, for example, desired RTP, average payout, volatility, game play, or other game design considerations. During operation, the gaming device 400 determines how to distribute the n feature game symbols by generating an RNG and using that RNG output to perform a lookup into the distribution lookup $table_n$, for the current value of n. The gaming device 400 identifies which weighted row of the table is identified by the RNG output and distributes the feature game symbols based on the symbol distribution defined for that row. It should be understood that other maximum or minimum numbers of feature game symbols or numbers of symbol columns 706 are possible.

During evaluation of the spin result, each of the feature game symbols 502 appearing in the symbol columns 706 are attributed to their associated reels 406 in the primary play area 408. More specifically, in addition to normal symbol evaluation and awarding, the gaming device 400 also determines a number of feature game symbols appearing for each reel 406. In addition to feature game symbols 502 appearing in the symbol columns 706, some results may also provide feature game symbols 502 on the reels 406. In this example, one feature game symbol 502 appears in the spin result on the second reel 406B and one feature game symbol 502 appears on the third reel 406C.

As such, during evaluation, the gaming device 400 determines that the first reel 406A has two feature game symbols 502 appearing (e.g., the two feature game symbols 502 from the first symbol column 706A), the second reel 406B has one feature game symbol 502 appearing (e.g., the one feature game symbol 502 on reel 406B), the third reel 406C has two feature game symbols 502 appearing (e.g., one feature game symbol 502 in the third symbol column 706C and one feature game symbol 502 on reel 406C), the fourth reel 406D has zero feature game symbols 502 appearing (e.g., on neither the fourth symbol column 706D nor the fourth reel 406D), and the fifth reel has one feature game symbol 502 appearing (e.g., from the fifth symbol column 706E). Since two or more of the left-most reels 406 include at least one feature game symbol (e.g., 2-of-a-kind or better), the player is awarded for the appearance of the feature game symbols on each of the left-most reels having at least one feature game symbol. In this example, five total feature game symbols appear in a 3-of-a-kind result (e.g., two from reel 406A, one from reel 406B, and two from reel 406C). Since the fourth reel 406D has no feature game symbols appearing, the presence of any feature game symbols 502 for the fifth reel 406E is insignificant in award determination. As such, the gaming device 400 awards this outcome, under a Reel Power evaluation, as a 3-of-a-kind of feature game symbols award (e.g., 3 left-most reels having at least one feature game symbol, valued at some number of credits, typically relative to the initial wager size), multiplied by 2 for the two feature game symbols of reel 406A, multiplied by 1 for the one feature game symbol of reel 406B, and again multiplied by 2 for the two feature game symbols of reel 406C. Accordingly, the feature game symbols 502 displayed in the symbol columns 706 effectively supplement the number of feature game symbols appearing on the reels 406 in the primary play area 408, thereby allowing additional symbols to be effectively distributed, during each play of the feature game, amongst the five reels 406. Such hybrid use of a dynamic display component in conjunction with fixed reel strips allows both addition and variation to what would otherwise be limited to what can appear naturally on a spin of the fixed reels 406.

Once the player has been awarded for the current play of the feature game (e.g., for the feature game symbols 502 and for any other winning combinations of other symbols), the gaming device 400 clears any of the feature game symbols 502 from the symbol columns 706 and prepares for the next play of the feature game.

Figure 7C:
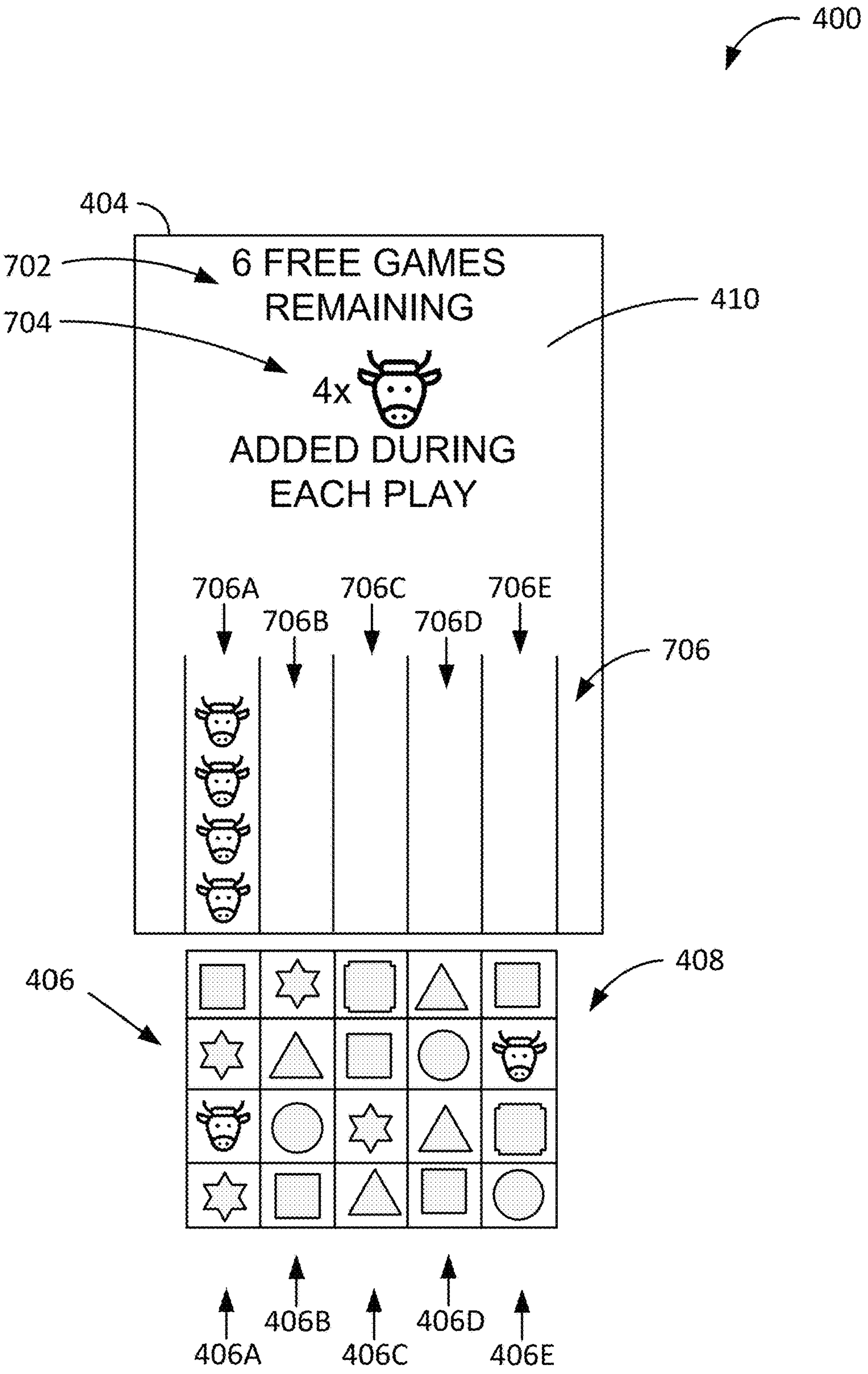
FIG. 7C illustrates a second example free play of the feature game.

FIG. 7C illustrates a second example free play of the feature game. More specifically, FIG. 7C illustrates example results of a second play of the feature game. Upon initiation of the second spin, any previous feature game symbols 502 are removed from the symbol columns 706 and redistributed as described above. In this example, all four feature game symbols 502 are added to the first symbol column 706A. During evaluation of the second play, the first reel 406A has five total feature game symbols 502 appearing (e.g., one on the first reel 406A and four in the first symbol column 706A). However, the second reel 406B has no feature game symbols 502 appearing. As such, the player does not receive an award for the feature game symbols 502.

Figure 8:
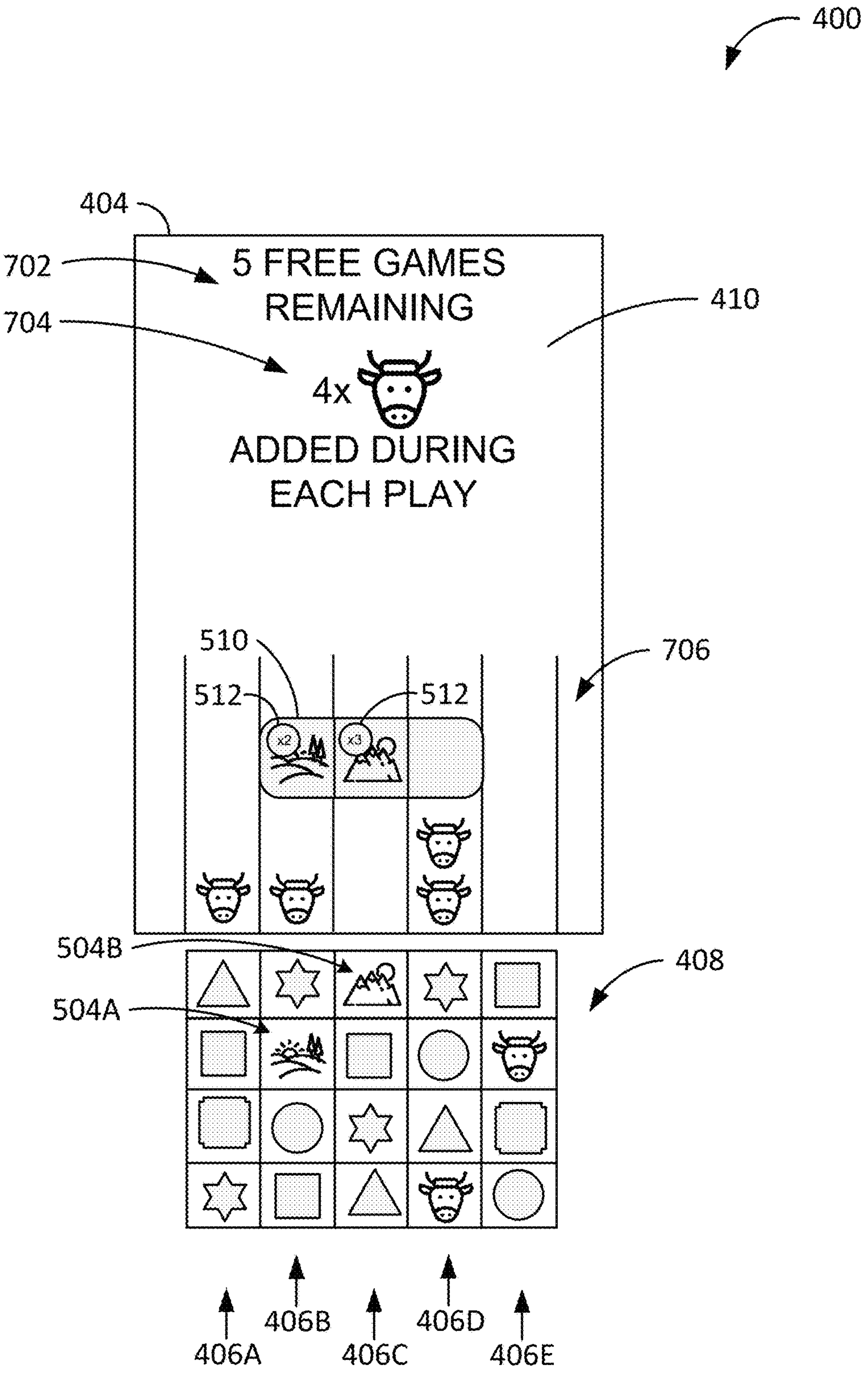
FIG. 8 illustrates an example play result of the feature game in which multiplier symbols appear on the reels.

In some embodiments, the gaming device 400 may additionally apply multipliers to the feature game similar to that described above with respect to the base game and FIG. 5. FIG. 8 illustrates an example play result of the feature game in which multiplier symbols 504A, 504B appear on the reels 406. In the example embodiment, the gaming device 400 additionally displays the multiplier symbol panel 510 within the secondary display area 410 and above the highest stack of feature game symbols 502 appearing in the symbol columns 706. In this example, the "×2" multiplier symbol 504A appears on the second reel 406B and the "×3" multiplier symbol 504B appears on the third reel 406C. As such, during evaluation of this play result, the gaming device 400 applies both the "×2" and the "×3" multipliers (e.g., for a total of "×6") to any win results. Since the first reel 406A and the second reel 406B each have at least one feature game symbol 502 appearing, the player will be awarded for a total of two feature game symbols 502, and that award will also be multiplied by the "×6" multipliers 504.

Figure 9:
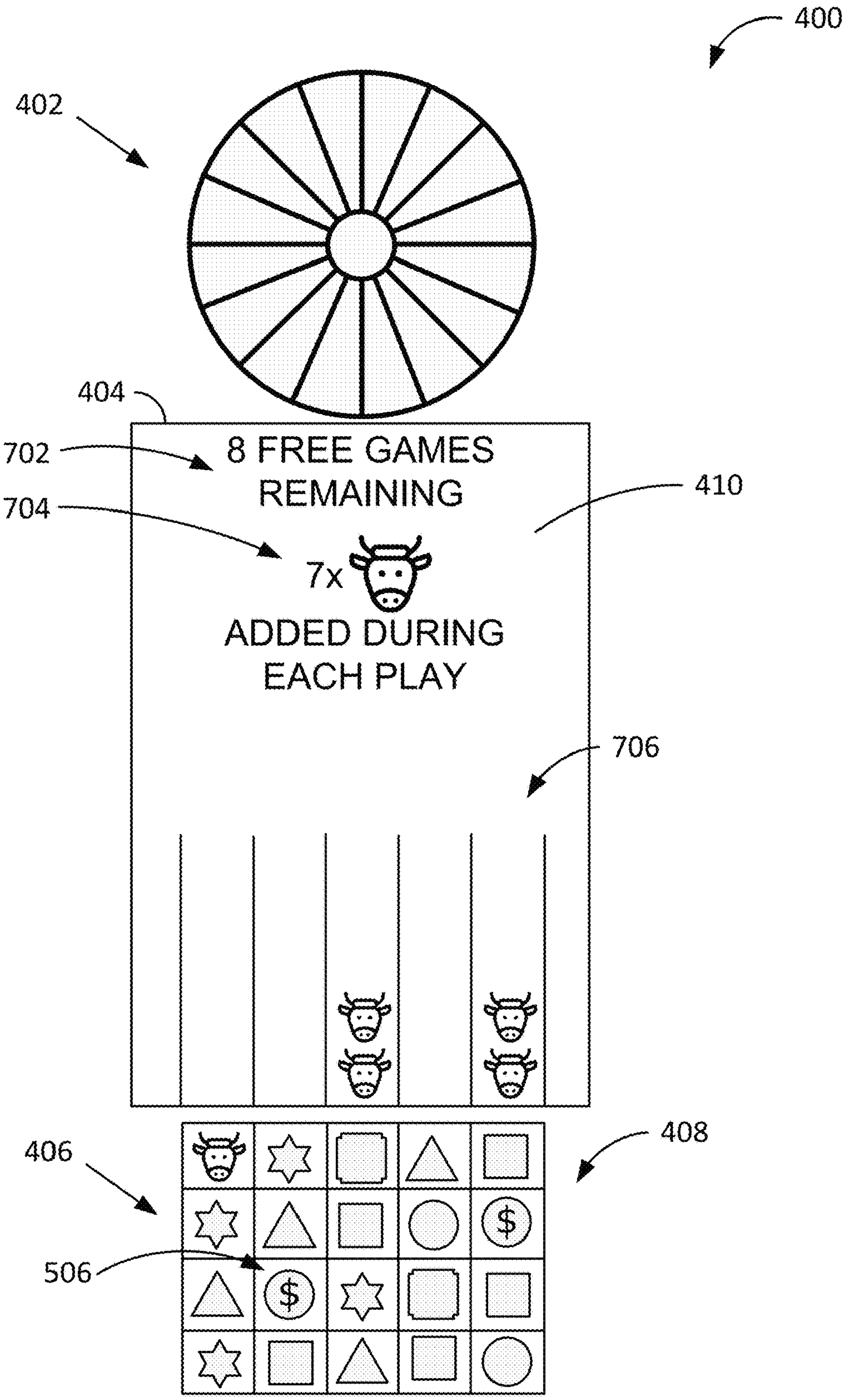
FIG. 9 illustrates a retrigger event for the feature game.

FIG. 9 illustrates a retrigger event for the feature game. In the example embodiment, the gaming device 400 includes a retrigger event that can be achieved during feature game play. The retrigger event may be triggered similar to the initial triggering of the feature game (e.g., the appearance of three or more activation symbols 506 in the primary play area 408 after a play). In the example embodiment, the retrigger event is configured to appear upon the occurrence of two or more activation symbols 506.

In the example shown in FIG. 9, two activation symbols 506 appear during the fourth free play of the feature game. After evaluating any other wins based on the spin result, the gaming device 400 reactivates the feature game. Reactivation of the feature game, in the example embodiment, includes adding a pre-determined number of free games (e.g., 5 more free games) to the currently-remaining number of free games 702. In other embodiments, reactivation of the feature game includes resetting the number of free games remaining 702 to the activation amount used to start the feature game (e.g., resetting to eight free games remaining). In addition, the player is awarded another spin of the feature game wheel 402. As described above, the player may be awarded with feature game symbols, a cash win, or a jackpot win. When the player wins feature game symbols, the new feature game symbols are added to the previous number of feature game symbols 704. Using FIG. 9 as an example, presuming the reactivation spin of the wheel 402 landed on three feature game symbols, the player would have a total of the four original feature game symbols plus the three newly won feature game symbols, for a total of n=7 feature game symbols 704. When the player recommences play of the feature game, seven feature game symbols will subsequently be distributed into the symbol columns during each free play (e.g., using $table_7$, the weighted distribution lookup table for seven feature game symbols). In some embodiments, if the player instead spins an award value spot 604 or a jackpot spot 606, the player may simply be awarded that spot and proceed back to the feature game, continuing with their previous number of feature game symbols and no additional feature game symbols.

Figure 10A:
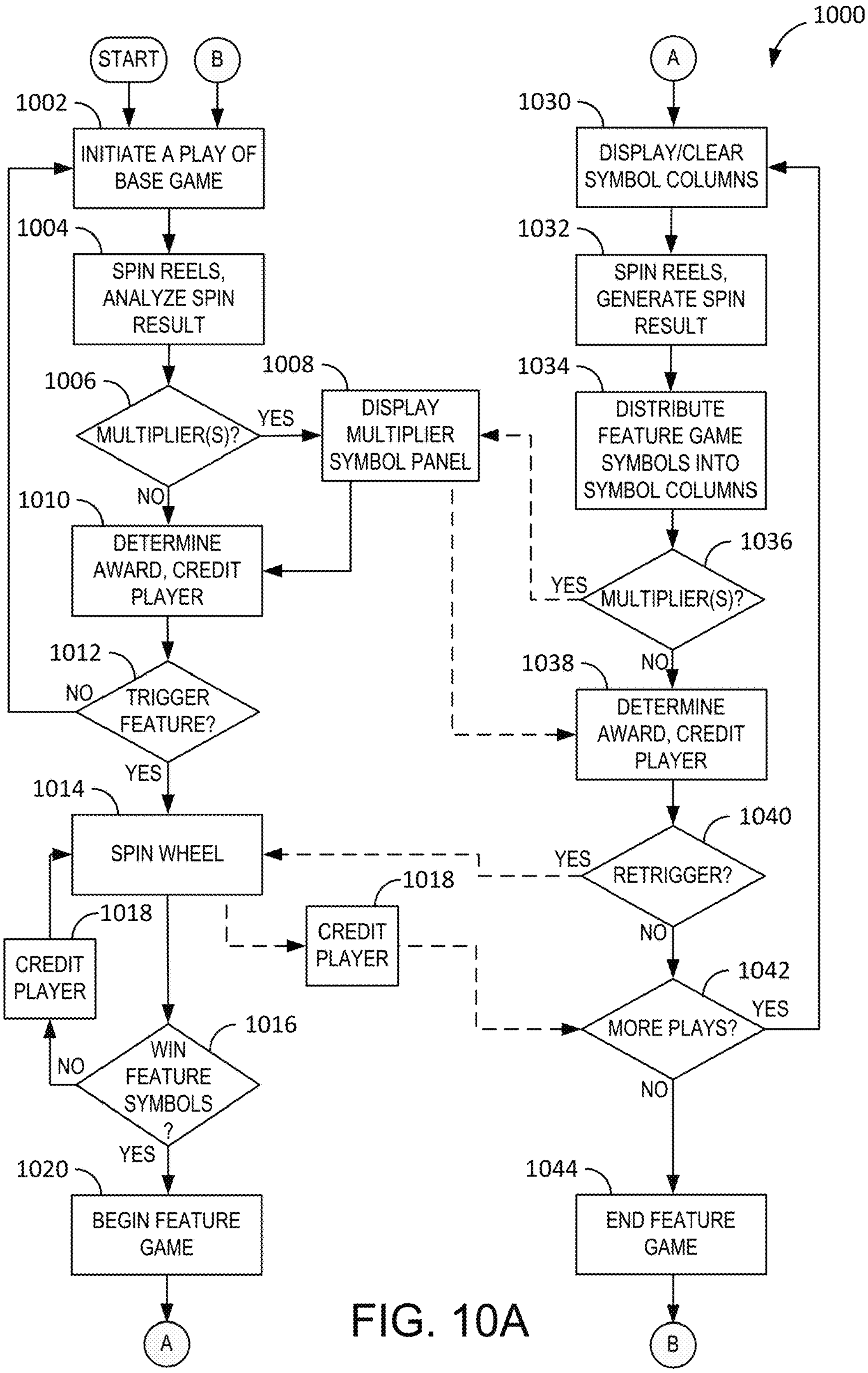
FIGS. 10A and 10B are a flow chart of a method of the game play of the example base game and feature game provided by the gaming device.
Figure 10B:
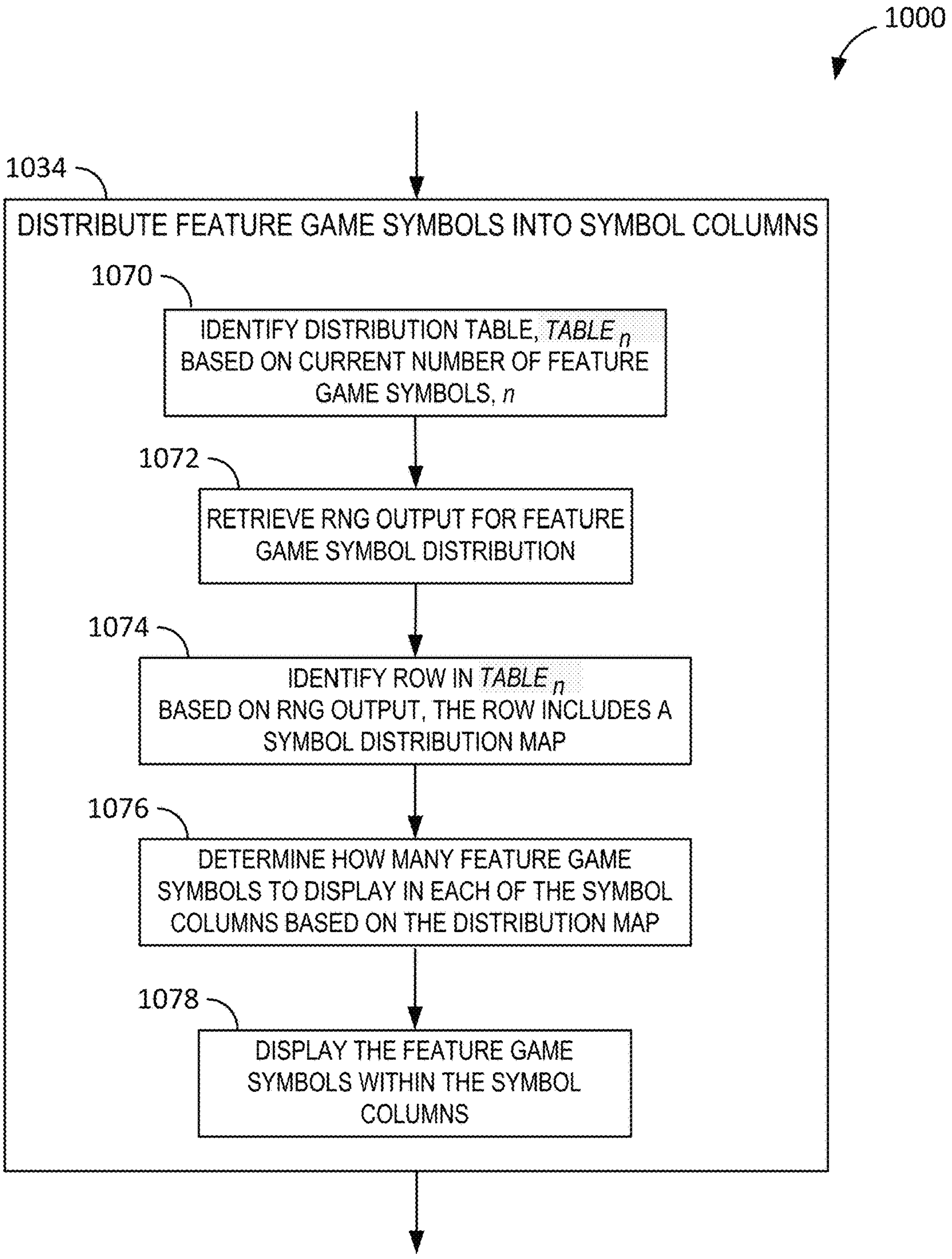

FIGS. 10A and 10B are a flow chart 1000 of a method of the game play of the example base game and feature game provided by the gaming device 400. In the example embodiment, the gaming device 400 performs the method using the example feature game wheel 402, display device 404, and reels 406 shown in FIG. 4. The gaming device 400 begins by initiating a play of the base game (see operation 1002). The gaming device 400 spins the reels 406 to generate a spin result and analyses that spin result (see operation 1004). If, at test 1006, one or more multiplier symbols appear within the spin result, the gaming device 400 displays the multiplier symbol panel 510 (see operation 1008). The gaming device 400 evaluates the spin result and determines and credits the player with any award won (see operation 1010). If, at test 1012, the feature game is not triggered by the spin result, the method returns to operation 1002 for another spin.

If, at test 1012, the feature game is triggered by the spin result of the base game, the gaming device 400 performs an initial spin of the feature game wheel 402 (see operation 1014). In some embodiments, and as shown in FIG. 10A, if, at test 1016, the wheel spin does not land on a feature symbol wheel spot 602, the player is credited with an award value (e.g., fixed value, jackpot value) (see operation 1018) and the gaming device 400 performs another spin of the wheel (returning to operation 1014). If, at test 1016, the spin of the feature game wheel 402 lands on a feature symbol wheel spot 602, the player is awarded a number of feature game symbols identified by the particular wheel spot and the feature game beings (see operation 1020). In some embodiments, on the first wheel spin of the feature game, if the wheel spin at operation 1014 does not award a number of feature game symbols (e.g., if the player wins an award value or jackpot), then the gaming device 400 may award the player as such and enter the feature game with the player having zero feature game symbols. In some embodiments, if, on subsequent spins of the feature game wheel 402, the wheel spin does not award any additional feature game symbols, then the gaming device 400 simply credits the player based on the wheel spin outcome and returns to may terminate the feature game if the player has no free spins left to play, returning to play of the base game at operation 1002.

Upon activation of the feature game at operation 1020, the player is awarded a pre-determined number of free plays of the feature game (e.g., 8 free plays) and the gaming device 400 begins feature game play by displaying or clearing symbol columns 706 (see operation 1030). The gaming device 400 spins the reels 406 to generate a spin result (see operation 1032). In addition, the gaming device 400 also distributes the number of feature game symbols currently awarded to the player into the various symbol columns 706 (e.g., randomly based on an RNG output) (see operation 1034).

FIG. 10B illustrates additional sub-steps for distributing feature game symbols 502 into symbol columns 706 of operation 1034. In the example embodiment, at operation 1070, the gaming device 400 identifies a distribution lookup table, table$_n$, based on a current number of feature game symbols, n, earned by the player. For example, if the player is currently awarded four feature game symbols (e.g., n=4), then the gaming device 400 identifies table 4 for the distributing of operation 1034. At operation 1072, the gaming device 400 retrieves an RNG output used for feature game symbol distribution. In the example embodiment, this RNG output is different than the RNG output used to identify a reel spin outcome of a spin of the feature game. In other embodiments, the same RNG output may be used for both the reel spin outcome and the feature game symbol distribution. At operation 1074, the gaming device 400 identifies a row in identified distribution lookup table (e.g., table 4) based on the RNG output (e.g., using the RNG output as an lookup value into the distribution lookup table). Each row in the table includes a symbol distribution map (e.g., showing how many of the n feature game symbols 502 to put into each of the five symbol columns 706A-706E, such as (1, 0, 0, 1, 2) from a table 4 row). At operation 1076, the gaming device 400 determines how many feature game symbols 502 to display in each of the symbol columns 706 based on the distribution map. At operation 1078, the gaming device 400 displays feature game symbols in each of the five symbol columns 706A-706E based on the distribution determination. For example, using the identified distribution map (1, 0, 0, 1, 2), the gaming device 400 adds one feature game symbol to symbol columns 706A and 706D (e.g., reels 1 and 4) and two feature game symbols to symbol column 706E (e.g., reel 5). As such, the n=4 feature game symbols 502 are distributed into the symbol columns 706.

Returning again to FIG. 10A, if, at test 1036, one or more multipliers are present in the spin result, the gaming device 400 displays the multiplier symbol panel (see operation 1008). The gaming device 400 determines and credits the player based on the evaluation of the spin result (see operation 1038). If, at test 1040, the spin result includes a retrigger condition, then the gaming device 400 provides another spin of the feature game wheel 402 to the player (see operation 1014). The additional spin may add additional feature game symbols to the current number of feature game symbols, may award the player a fixed value, or may award the player a jackpot amount. If, at test 1042, the player has one or more free plays of the feature game remaining, the gaming device 400 returns to operation 1030, clearing the symbol columns 706 and beginning the next play of the feature game. If, at test 1042, the player has no more free plays remaining, then the feature game ends (see operation 1044) and the gaming device 400 returns to base game play at operation 1002.

A computer, controller, or server, such as those described herein, includes at least one processor or processing unit and a system memory. The computer, controller, or server typically has at least some form of computer readable non-transitory media. As used herein, the terms “processor” and “computer” and related terms, e.g., “processing device”, “computing device”, and “controller” are not limited to just those integrated circuits referred to in the art as a computer, but broadly refers to a microcontroller, a microcomputer, a programmable logic controller (PLC), an application specific integrated circuit, and other programmable circuits “configured to” carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:
a memory; and
a processor configured to execute instructions stored in the memory, which when executed, cause the processor to:
cause display of a plurality of reels in a primary play area for a first play instance;
cause display of a plurality of symbol columns in a secondary play area, each symbol column of the plurality of symbol columns being positioned in association with a reel of the plurality of reels;
generate an output of a random number generator ("RNG");
perform a lookup of a weighted table stored in the memory using the RNG output;
distribute, based on the lookup, a number of secondary symbols into the plurality of symbol columns for the first play instance, the number of secondary symbols supplementing symbols on the plurality of reels; and
cause display of an outcome of the first play instance, wherein the outcome is based at least in part on attributing the secondary symbols to their associated reels.

2. The electronic gaming system of claim 1, wherein the instructions further cause the processor to determine a credit award based on the outcome.

3. The electronic gaming system of claim 1, wherein the instructions further cause the processor to cause display of a spinning wheel, the wheel including a plurality of wheel spots that award one or more secondary game symbols, the spinning of the wheel identifying the number of secondary symbols that are distributed.

4. The electronic gaming system of claim 1, wherein the first play instance is a first play instance of a feature game including a plurality of play instances, wherein the instructions further cause the processor to:
cause display of a spin of the plurality of reels for a second play instance of the feature game; and
distribute an additional number of secondary symbols available for use during each play instance of the feature game.

5. The electronic gaming system of claim 4, wherein the spin results in a retrigger event, and wherein the instructions further cause the processor to award additional play instances of the feature game in response to the retrigger event.

6. The electronic gaming system of claim 1, wherein the instructions further cause the processor to:
cause display of a spin of the plurality of reels in response for second play instance, the spin resulting in a retrigger event; and
award a spin of a feature game wheel in response to the retrigger event.

7. The electronic gaming system of claim 1, wherein the instructions further cause the processor to:
cause display of a multiplier symbol panel on the secondary play area; and
in response to the outcome including one or more multiplier symbols on the reels, cause display of the one or more multiplier symbols in the multiplier symbol panel.

8. The electronic gaming system of claim 7, wherein the multiplier symbol panel includes a plurality of spots, wherein each spot of the plurality of spots is associated with a reel of the plurality of reels, wherein displaying the one or more multiplier symbols includes displaying the one or more multiplier symbols in the spot of the plurality of spots associated with the reel upon which the multiplier symbol occurs.

9. The electronic gaming system of claim 7, wherein the multiplier symbol panel is displayed in the secondary play area above a highest stack of secondary symbols of the plurality of symbol columns.

10. The electronic gaming system of claim 1, wherein the instructions further cause the processor to cause display of a current number of secondary symbols awarded for use during feature game play.

11. The electronic gaming system of claim 1, wherein the instructions further cause the processor to:
identify the lookup table from a plurality of distribution lookup tables based on the number of distributed secondary symbols; and
identify a row in the lookup table based on the RNG output, wherein distributing the number of secondary symbols includes distributing the number of secondary symbols based on the identified row.

12. The electronic gaming system of claim 1, wherein each reel of the plurality of reels is a mechanical reel.

13. A non-transitory computer-readable media containing instructions embodied thereon which, when executed by at least one processor, cause the at least one processor to:
cause display of a plurality of reels in a primary play area for a first play instance;
cause display of a plurality of symbol columns in a secondary play area, each symbol column of the plurality of symbol columns being positioned in association with a reel of the plurality of reels;
generate an output of a random number generator ("RNG");
perform a lookup of a weighted table using the RNG output;
distribute, based on the lookup, a number of secondary symbols into the plurality of symbol columns for the first play instance, the number of secondary symbols supplementing symbols on the plurality of reels; and
cause display of an outcome of the first play instance, wherein the outcome is based at least in part on attributing the secondary symbols to their associated reels.

14. The computer-readable media of claim 13, wherein the instructions further cause the processor to cause display of a spinning wheel, the wheel including a plurality of wheel spots that award one or more secondary game symbols, the spinning of the wheel identifying the number of secondary symbols that are distributed.

15. The computer-readable media of claim 13, wherein the instructions further cause the processor to:
cause display of a multiplier symbol panel on the secondary play area; and
in response to the outcome including one or more multiplier symbols on the reels, cause display of the one or more multiplier symbols in the multiplier symbol panel.

16. The computer-readable media of claim 15, wherein the multiplier symbol panel includes a plurality of spots, wherein each spot of the plurality of spots is associated with a reel of the plurality of reels, wherein displaying the one or more multiplier symbols includes displaying the one or more multiplier symbols in the spot of the plurality of spots associated with the reel upon which the multiplier symbol occurs.

17. The computer-readable media of claim 13, wherein the instructions further cause the processor to:

identify the lookup table from a plurality of distribution lookup tables based on the number of distributed secondary symbols; and identify a row in the lookup table based on the RNG output, wherein distributing the number of secondary symbols includes distributing the number of secondary symbols based on the identified row.

18. A gaming device comprising:

a display device; and a game controller configured to execute instructions stored in a tangible, non-transitory, computer-readable storage medium, which, when executed by the game controller, cause the game controller to at least:

cause display of a plurality of reels in a primary play area of the display device for a first play instance;

cause display of a plurality of symbol columns in a secondary play area of the display device, each symbol column of the plurality of symbol columns being positioned in association with a reel of the plurality of reels;

generate an output of a random number generator ("RNG");

perform a lookup of a weighted table using the RNG output;

distribute, based on the lookup, a number of secondary symbols into the plurality of symbol columns for the first play instance, the number of secondary symbols supplementing symbols on the plurality of reels; and cause display on the display device of an outcome of the first play instance, wherein the outcome is based at least in part on attributing the secondary symbols to their associated reels.

19. The gaming device of claim 18, wherein the instructions further cause the game controller to cause display at the display device of a spinning wheel, the wheel including a plurality of wheel spots that award one or more secondary game symbols, the spinning of the wheel identifying the number of secondary symbols that are distributed.

20. The gaming device of claim 18, wherein the instructions further cause the game controller to:

identify the lookup table from a plurality of distribution lookup tables based on the number of distributed secondary symbols; and identify a row in the lookup table based on the RNG output, wherein distributing the number of secondary symbols includes distributing the number of secondary symbols based on the identified row.

* * * * *